United States Patent [19]

Mazac

[11] Patent Number: 4,577,897

[45] Date of Patent: Mar. 25, 1986

[54] LIFTING TOOL

[76] Inventor: Joe O. Mazac, 1409 Kathy, Sealy, Tex. 77474

[21] Appl. No.: 540,151

[22] Filed: Oct. 7, 1983

[51] Int. Cl.⁴ ............................................. B65G 7/12
[52] U.S. Cl. ..................................... 294/15; 294/169
[58] Field of Search ............... 294/4, 15, 17, 26, 27 R, 294/29, 31 R, 32, 62, 63 B, 67 A, 67 AB, 90, 92, 145, 167–169, 159, 164

[56] References Cited

U.S. PATENT DOCUMENTS

| | | | |
|---|---|---|---|
| 680,058 | 8/1901 | Meyer | 294/27 R |
| 1,460,554 | 7/1923 | Moore | 294/159 |
| 1,879,532 | 9/1932 | Schlebecker | 294/15 |
| 1,973,568 | 9/1934 | Keith | 294/159 X |
| 2,271,901 | 2/1942 | Smith et al. | 294/26 |
| 2,378,454 | 6/1945 | Werling | 294/15 |
| 2,605,128 | 7/1952 | Schneider | 294/15 |
| 2,764,447 | 9/1956 | Schmidt | 294/92 |
| 3,436,778 | 4/1969 | Stevens et al. | 294/15 X |
| 3,592,500 | 7/1971 | Setzler | 294/164 X |
| 3,645,212 | 2/1972 | Dahlstrom | 294/26 X |

FOREIGN PATENT DOCUMENTS 857839  1/1961  United Kingdom .................. 294/15

Primary Examiner—Johnny D. Cherry
Attorney, Agent, or Firm—Browning, Bushman, Zamecki & Anderson

[57] ABSTRACT

Disclosed is a lifting tool for applying vertical forces to loads. A body carries a catch device for engaging such a load, and therebelow a support mechanism for receiving the load and limiting rotational movement of the load about the point of engagement with the catch mechanism. A handle is provided above the load whereby vertical forces may be applied. The handle and the support mechanism are collapsible relative to the body for storage purposes, for example.

12 Claims, 5 Drawing Figures

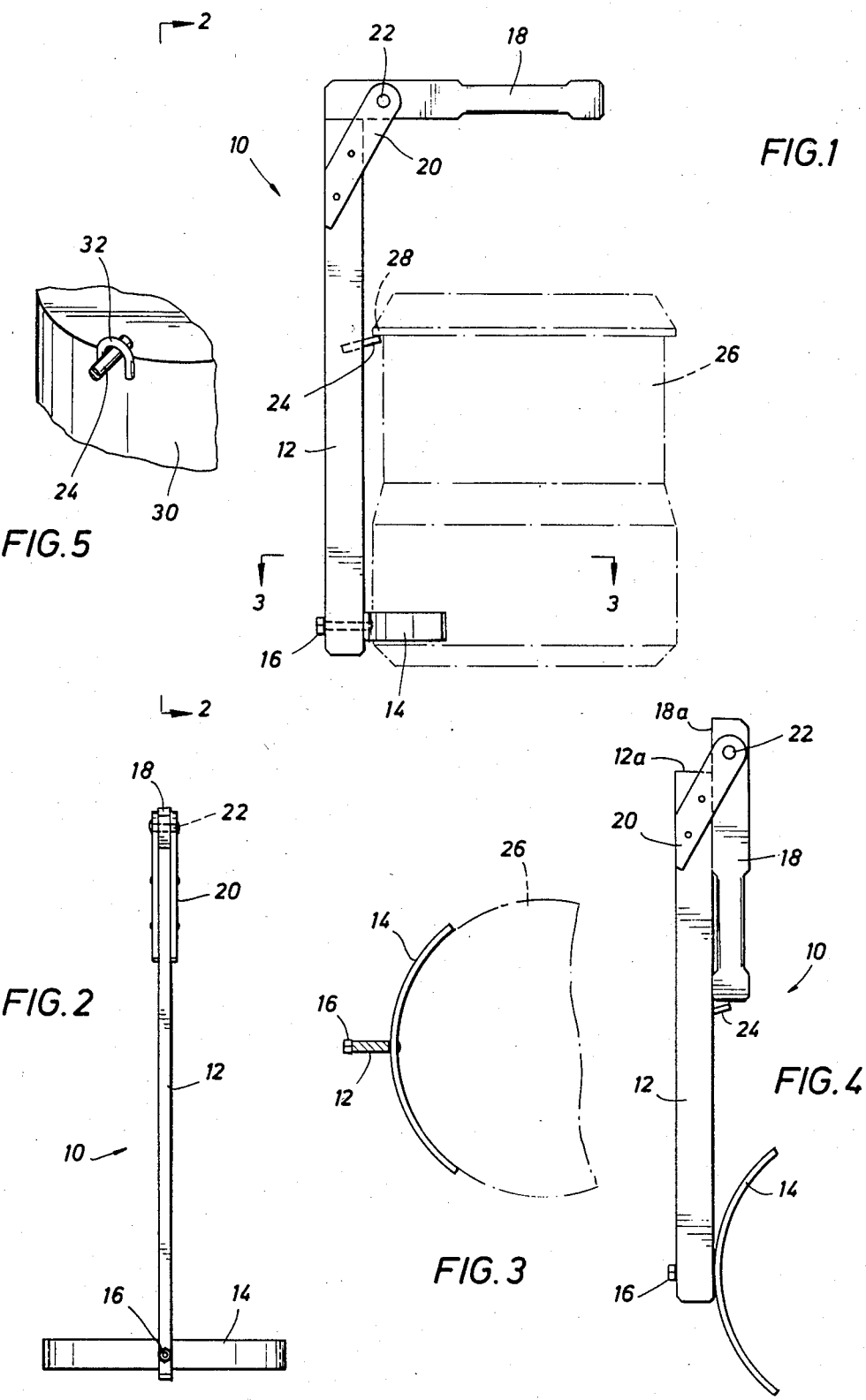

LIFTING TOOL

BACKGROUND OF THE INVENTION

1. Field of the Invention

The present invention pertains to techniques for manipulating and applying vertical force to loads. More particularly, the present invention relates to tools, including hand tools, for engaging and carrying loads, and finds particular application in the area of air conditioning maintenance and repair, wherein compressors must be hand-manipulated.

2. Brief Description of Prior Art

Air conditioning compressors are generally contained in cylindrical housings. To replace or repair such compressors, the housing units must be manipulated into and out of the air conditioning systems. Such maneuvers generally require raising and lowering the compressors into and out of relatively confined spaces, and over the system housings. Prior techniques for doing so would require, generally, the service person to reach over the various components of the system, and to grasp the compressor unit, as well as could be done. The compressor, which may be of substantial weight, must then be raised out of the system. Replacement of the compressor requires generally reversal of these operations. Such maneuvers are generally difficult and awkward, and may require considerable physical strain.

While the compressors are contained in generally cylindrical housings, the housings are usually equipped with an eye for support thereof in the construction of the housings, for example. The present invention makes use of such eyes, or, would utilize any such projection or like feature, including just a lip for example, which might be present on a cylindrical body to provide a method and apparatus whereby the body can be relatively easily manipulated.

SUMMARY OF THE INVENTION

The present invention provides a manipulating tool and method whereby a rest, or support structure, and latch device are carried by a body. The latch device may engage a load to which vertical force is to be applied, and provides the means for transmitting such force to the load. The support structure is positioned along the body below the latch device, and receives the load to limit rotational movement of the load about the latch mechanism. A handle is provided on the body and is so constructed and positioned relative to the body that vertical forces may be applied to the tool by way of the handle. Both the handle and the support structure may be collapsible relative to the body. In particular, the handle may be pivotally mounted on the body. Since the support structure receives and limits rotation of the load and is "open-bottomed," the length of the load may extend below the support structure an indefinite distance.

BRIEF DESCRIPTION OF THE DRAWINGS

FIG. 1 is a side elevation of a tool according to the present invention in operating configuration, and illustrates a load, shown in phantom, to be manipulated;

FIG. 2 is a back elevation of the tool as illustrated in FIG. 1, taken generally along the line 2—2 of FIG. 1;

FIG. 3 is a transverse cross section of the tool taken along the line 3—3 of FIG. 1;

FIG. 4 is a side elevation of the manipulating tool in collapsed configuration; and FIG. 5 is a fragmentary view in perspective showing the latch of the manipulating tool engaging an eye of a load.

DETAILED DESCRIPTION OF PREFERRED EMBODIMENT

A manipulating tool according to the present invention is shown generally at 10 in FIGS. 1, 2 and 4. An elongate body 12, which may be in the form of a rigid strip, carries at its lower end a support member 14. The support member 14 may be mounted on the body 12 by means of a bolt 16 or the like, which may be loosened to permit rotation of the support member between the operating configuration shown in FIGS. 1 and 2, wherein the support structure is positioned generally perpendicular to the body, and a collapsed configuration as shown in FIG. 4, wherein the support structure is generally aligned with the body for convenience in storage, for example.

At the upper end of the body 12, a handle 18 is mounted by means of a bracket 20. The bracket 20 carries a pivot pin 22 at a location above and forward of the body 12 as shown. The pivot pin 22 passes through an appropriate bore in the handle 18 whereby the handle is rotatable about the pivot pin between an operating configuration as illustrated in FIGS. 1 and 2, and a collapsed configuration wherein the handle lies generally along and against the body as shown in FIG. 4. As may be appreciated by reference to FIGS. 1 and 4, the pivot pin 22 is received by the handle 18 at a position removed from the back end of the handle. This location of the pin 22 along the handle 18, combined with the location of the pin in front of and above the top end of the body 12, positions the end portion 18a of the bottom of the handle against the top surface 12a of the body (see FIG. 4) when the handle is in the operating configuration of FIG. 1. Then, the handle 18 is located perpendicular to the body 12 so that upward force applied along the handle will generally raise, or at least support, the tool in a vertical (or, without a load, nearly vertical) orientation as illustrated, maintaining the handle rigidly in place.

The body 12 also carries a catch, or latch mechanism, 24 protruding from the front of the body and angled upwardly after the fashion of a hook. The latch 24 may be utilized to engage a load and, in cooperation with the handle 18 and body 12, transmit vertical force to the load to lift or at least support the load. In FIG. 1, a generally cylindrical load is shown in phantom at 26. Such a load might include an air conditioner compressor in its housing, for example. The cylindrical shape of the load 26 may be received by the arcuate recess defined by the support structure 14, as illustrated in FIG. 3, for example. It will be appreciated that the support structure 14 may be constructed to define a recess having a different shape, or having a structured shape, to accommodate the shapes of loads to be manipulated.

The load 26 illustrated in FIG. 1 includes a lip, or shoulder, 28 under which the end of the latch mechanism 24 may fit. In FIG. 5, another type of engageable device that may be carried by such a load is illustrated. For example, a load 30 may include an eye 32 which may receive the latch 24. Such an eye is typically found on an air conditioner compressor housing, wherein it serves as a convenient handle for hanging the housing during construction of the air conditioning component, for example. It will be appreciated that other types of features on loads to be manipulated may be employed to be engaged by the latch mechanism 24, which may also be altered in size and shape, for example, to accommodate such features.

Whatever the feature on the load to be manipulated, the latch mechanism 24 may engage such feature and apply vertical force to the load through such feature.

A manipulating tool according to the present invention may be collapsed as illustrated in FIG. 4 and as discussed above, for purposes of storage and handling for example. For use, the support structure 14 is rotated to the operating configuration of FIGS. 1-3, and the handle 18 is raised to its operating configuration as illustrated in FIGS. 1 and 2, with the handle surface 18a in abutment against the body surface 12a. The tool 10 is then positioned about the load, with the latch mechanism 24 engaging an appropriate feature of the load and the support structure 14 receiving, or positioned to receive, the load. The handle 18 may then be grasped or otherwise engaged for the purpose of applying vertical force thereto. The balance point of the combination of the load and tool 10 may vary, but will generally be along the handle 18 or close thereto. The handle may be lifted by vertical force applied thereto, for example, whereby the force is transmitted through the latch mechanism 24 to the load.

Since the load is supported at the point of engagement of the load with the latch mechanism, the load may tend to rotate clockwise as viewed in FIG. 1 about that point of engagement. However, the support mechanism 14 receives the load as illustrated in FIG. 1, for example, and prevents the load from further such clockwise rotation. Additionally, the recess defined by the support structure 14 cradles the load to prevent the load from rotating to either side of the body 12. Thus, the combination of the latch mechanism 24 and the support structure 14 provides a stable, multiple point engagement between the tool 10 and the load, and whereby the load may be supported vertically. In this manner, the load may be lifted or lowered conveniently by simply applying appropriate vertical force to the handle 18.

In particular, where the load is an air conditioning compressor, the tool may be applied to the compressor as described, and the compressor conveniently raised and lowered either out of or into an air conditioning system.

It will be appreciated that the present invention provides a technique for conveniently manipulating loads. In particular, the present invention provides a manipulating tool which is collapsible for convenience of storage, for example, and which may be used to conveniently support loads from a single location for application of vertical force, such as the handle 18 as described above.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A manipulating tool for carrying loads, comprising:
   a. body means;
   b. support means mounted on said body means for preventing rotational movement of such a load;
   c. handle means pivotally mounted on said body means remote from said support means and movable relative to said body means between a collapsed configuration relative to said body means and an extended configuration wherein said handle means may be maintained rigid against said body means as said tool is supported by said handle means; and
   d. latch means carried by said body means between said handle means and said support means for engaging a load generally above said support means and applying lifting force thereto whereby said load may be carried with said handle means generally extending over said load.

2. A manipulating tool as defined in claim 1 wherein said support means defines a recess for receiving, at least in part, loads to be carried by means of said tool.

3. A manipulating tool as defined in claim 1 wherein said support means is so mounted on said body means as to be selectively adjustable between a first configuration wherein said support means may receive, at least in part, loads to be carried by means of said tool, and a collapsed configuration relative to said body means.

4. A manipulating tool as defined in claim 1 wherein said latch means comprises hook means for engaging and supporting loads to be carried by said tool.

5. A tool for carrying loads, comprising:
   a. body means;
   b. latch means carried by said body means for engaging and applying vertical force to such a load;
   c. support means carried by said body means for at least partially receiving said load at a location below the engagement of said latch means with said load; and
   d. handle means carried by said body means for application of vertical force to said tool, said handle means being pivotally mounted on said body means and movable relative thereto between a collapsed configuration and an extended configuration wherein said handle means may be maintained rigid against said body means as said tool is supported by said handle means;
   e. whereby said latch means may so engage said load, which is then supported against rotational movement relative to said body means by said support means, and whereby vertical force may then be applied through said latch means to said load by application of vertical force to said handle means, generally extending over said load, to carry said load by said tool.

6. A tool as defined in claim 5 wherein said support means defines a recess for receiving, at least in part, loads to be carried by means of said tool.

7. A tool as defined in claim 5 wherein said support means is so mounted on said body means as to be selectively adjustable between a first configuration wherein said support means may receive, at least in part, loads to be carried by means of said tool, and a collapsed configuration relative to said body means.

8. A manipulating tool for carrying loads, comprising:
   a. body means;
   b. support means mounted on said body means for preventing rotational movement of such a load, said support means being so mounted on said body means as to be selectively adjustable between a first configuration wherein said support means may receive, at least in part, loads to be carried by means of said tool, and a collapsed configuration relative to said body means;

c. handle means mounted on said body means remote from said support means; and d. latch means carried by said body means between said handle means and said support means for engaging a load generally above said support means and applying lifting force thereto whereby said load may be carried with said handle means generally extending over said load.

9. A manipulating tool as defined in claim 8 wherein said support means defines a recess for so receiving, at least in part, loads to be carried by means of said tool.

10. A manipulating tool as defined in claim 8 wherein said latch means comprises hook means for engaging and supporting loads to be carried by said tool.

11. A tool for carrying loads, comprising:
a. body means;
b. latch means carried by said body means for engaging and applying vertical force to such a load;
c. support means carried by said body means for at least partially receiving said load at a location below the engagement of said latch means with said load, said support means being so mounted on said body means as to be selectively adjustable between a first configuration wherein said support means may receive, at least in part, loads to be carried by means of said tool, and a collapsed configuration relative to said body means; and d. handle means carried by said body means for application of vertical force to said tool;

e. whereby said latch means may so engage said load, which is then supported against rotational movement relative to said body means by said support means, and whereby vertical force may then be applied through said latch means to said load by application of vertical force to said handle means, generally extending over said load, to carry said load by said tool.

12. A tool as defined in claim 11 wherein said support means defines a recess for receiving, at least in part, loads to be carried by means of said tool.

* * * * *